US010940722B2

(12) United States Patent
Nakagawa

(10) Patent No.: US 10,940,722 B2
(45) Date of Patent: Mar. 9, 2021

(54) TIRE FOR A MOTORCYCLE

(71) Applicant: Sumitomo Rubber Industries, Ltd., Hyogo (JP)

(72) Inventor: Mamoru Nakagawa, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 178 days.

(21) Appl. No.: 16/190,192

(22) Filed: Nov. 14, 2018

(65) Prior Publication Data

US 2019/0176525 A1 Jun. 13, 2019

(30) Foreign Application Priority Data

Dec. 11, 2017 (JP) .............................. JP2017-237096

(51) Int. Cl.
*B60C 11/04* (2006.01)
*B60C 11/03* (2006.01)
*B60C 11/12* (2006.01)

(52) U.S. Cl.
CPC .......... *B60C 11/0302* (2013.01); *B60C 11/04* (2013.01); *B60C 11/12* (2013.01); *B60C 11/1236* (2013.01); *B60C 11/1259* (2013.01); *B60C 11/1272* (2013.01); *B60C 11/1204* (2013.01); *B60C 2011/0348* (2013.01); (Continued)

(58) Field of Classification Search
CPC ..... B60C 11/0302; B60C 11/04; B60C 11/12; B60C 11/1236; B60C 11/1259; B60C 11/1272; B60C 11/1204; B60C 2011/0353; B60C 2011/0365; B60C 2011/0374;

(Continued)

(56) References Cited

U.S. PATENT DOCUMENTS

| 9,446,628 B2 * | 9/2016 | Bestgen .............. B60C 11/0306 |
| 2013/0206297 A1 | 8/2013 | Bestgen |
| 2013/0228256 A1 | 9/2013 | Shibamoto |

FOREIGN PATENT DOCUMENTS

| CN | 20142579240 U | * 10/2014 | ............. B60C 11/03 |
| CN | 204210249 U | 3/2015 | |

(Continued)

OTHER PUBLICATIONS

Extended European Search Report issued by the European Patent Office dated Nov. 29, 2018, which corresponds to EP18199854.3-1012 and is related to U.S. Appl. No. 16/190,192.

*Primary Examiner* — Matthew J Daniels
*Assistant Examiner* — Shibin Liang
(74) *Attorney, Agent, or Firm* — Studebaker & Brackett PC

(57) ABSTRACT

A tire (1) for a motorcycle comprises a tread portion (2) comprising main grooves (3) and narrow grooves (4). The main grooves (3) include first main grooves (5) and second main grooves (6) arranged on an axially outer side of the first main grooves (5). The narrow grooves (4) include open narrow grooves (7) and semi-open narrow grooves (8). Each of the open narrow grooves (7) is arranged such that one end (7a) is substantially connected with respective first main groove (5) and the other end (7b) is substantially connected with respective second main grooves (6). A first end (8a) of each of the semi-open narrow grooves (8) is substantially connected with one of the first main grooves (5) or the second main grooves (6). A second end (8b) of each of the semi-open narrow grooves (8) terminates on a ground contacting surface (2a) of the tread portion (2).

16 Claims, 4 Drawing Sheets

(52) U.S. Cl.
CPC ............. *B60C 2011/0353* (2013.01); *B60C 2011/0365* (2013.01); *B60C 2011/0374* (2013.01); *B60C 2011/0381* (2013.01); *B60C 2011/1209* (2013.01); *B60C 2011/1254* (2013.01); *B60C 2200/10* (2013.01)

(58) Field of Classification Search
CPC ..... B60C 2011/0381; B60C 2011/1209; B60C 2011/1254; B60C 2200/10
See application file for complete search history.

(56) References Cited

FOREIGN PATENT DOCUMENTS

| | | | |
|---|---|---|---|
| CN | 205273057 U | 6/2016 | |
| CN | 107415596 A | 12/2017 | |
| JP | H09-039516 A | 2/1997 | |
| JP | 2013180664 * | 3/2012 | ............. B60C 11/04 |
| JP | 2013-180664 A | 9/2013 | |
| WO | 2017/073768 A1 | 5/2017 | |

* cited by examiner

TIRE FOR A MOTORCYCLE

TECHNICAL FIELD

The present invention relates to a tire for a motorcycle.

BACKGROUND ART

FIG. 4 is a schematic diagram showing the mechanism of cornering of a motorcycle. As shown in FIG. 4, the cornering of a motorcycle is carried out by rolling which is leaning the vehicle body (may be referred to as banking) so as to rotate to the left or to the right about a roll axis (z) extending obliquely upward from a ground contacting point (pr) of a rear wheel tire (ar) and by steering of a front wheel tire (af) occurred in response to this rolling.

In a tire for a motorcycle, in order to improve cornering performance, it is required that the response of the leaning of the vehicle body is linear from the early stage of the roll to the end stage of the roll (hereinafter such characteristic is referred to as "transient characteristic"). In order to improve such transient characteristics, a tread pattern as disclosed in Japanese Unexamined Patent Application Publication No. 2013-180664 (Patent Literature 1) has been proposed, for example.

However, a tire for a motorcycle having a tread pattern as disclosed in Patent Literature 1 was not the one configured in consideration of alacrity that is one of the characteristics of the cornering performance. The "alacrity" means responsiveness of the vehicle body when a rider consciously changes a camber angle.

SUMMARY OF THE INVENTION

The present invention was made in view of the above, and a primary object thereof is to provide a tire for a motorcycle having improved cornering performance by improving the transient characteristic and the alacrity based on improving arrangement of narrow grooves and the like.

In one aspect of the present invention, a tire for a motorcycle comprises a tread portion, wherein the tread portion is provided with main grooves each having a groove width larger than 2 mm and narrow grooves each having a groove width not more than 2 mm, the main grooves include first main grooves and second main grooves arranged on an outer side in a tire axial direction of the first main grooves, the narrow grooves include open narrow grooves and semi-open narrow grooves, each of the open narrow grooves is arranged such that one end thereof is substantially connected with adjacent one of the first main grooves and the other end thereof is substantially connected with adjacent one of the second main grooves, and each of the semi-open narrow grooves has a first end and a second end, and the first end is substantially connected with adjacent one of the first main grooves or the second main grooves and the second end terminates on a ground contacting surface of the tread portion without being substantially connected with any one of the main grooves.

In another aspect of the invention, it is preferred that each of the narrow grooves extends obliquely with respect to a tire circumferential direction and has a groove depth increasing from an outer side in the tire axial direction toward a side of a tire equator.

In another aspect of the invention, it is preferred that the semi-open narrow grooves include first semi-open narrow grooves whose first ends are substantially connected with the first main grooves and second semi-open narrow grooves whose first ends are substantially connected with the second main grooves.

In another aspect of the invention, it is preferred that the second ends of the second semi-open narrow grooves are arranged in a region in a range of from 60% to 90% of a tread development half width from the tire equator toward the outer side in the tire axial direction.

In another aspect of the invention, it is preferred that each of the first semi-open narrow grooves extends so as to cross the tire equator.

In another aspect of the invention, it is preferred that the second ends of the first semi-open narrow grooves are arranged in a region within 5% of the tread development half width from the tire equator toward the outer side in the tire axial direction.

In another aspect of the invention, it is preferred that the narrow grooves include closed narrow grooves each having both ends terminating on the ground contacting surface of the tread portion without being substantially connected with any one of the main grooves.

In another aspect of the invention, it is preferred that the groove widths of the closed narrow grooves are the largest among those of the narrow grooves.

In another aspect of the invention, it is preferred that the tread portion includes a straight-running ground contacting region which is a portion thereof to be in contact with a flat surface when the tire is mounted on a standard rim, inflated to a standard inner pressure, and in contact with a flat surface with zero camber angles by being loaded with a standard tire load, and inner ends in the tire axial direction of the closed narrow grooves are arranged on the outer side in the tire axial direction of the straight-running ground contacting region.

In another aspect of the invention, it is preferred that the closed narrow grooves are arranged at angles largest among the narrow grooves with respect to the tire circumferential direction.

In another aspect of the invention, it is preferred that each of the narrow grooves is inclined in the same direction with respect to the tire circumferential direction.

In another aspect of the invention, it is preferred that each of the narrow grooves is inclined in a direction opposite to the second main grooves with respect to the tire circumferential direction.

In another aspect of the invention, it is preferred that the semi-open narrow grooves include first semi-open narrow grooves each having the first end substantially connected with one of the first main grooves and second semi-open narrow grooves each having the first end substantially connected with one of the second main grooves, and outer ends in the tire axial direction of the closed narrow grooves are arranged on the outer side in the tire axial direction of the second ends of the second semi-open narrow grooves.

DESCRIPTION OF THE PREFERRED EMBODIMENT

An embodiment of the present invention will now be described below in detail in conjunction with accompanying drawings.

Figure 1:
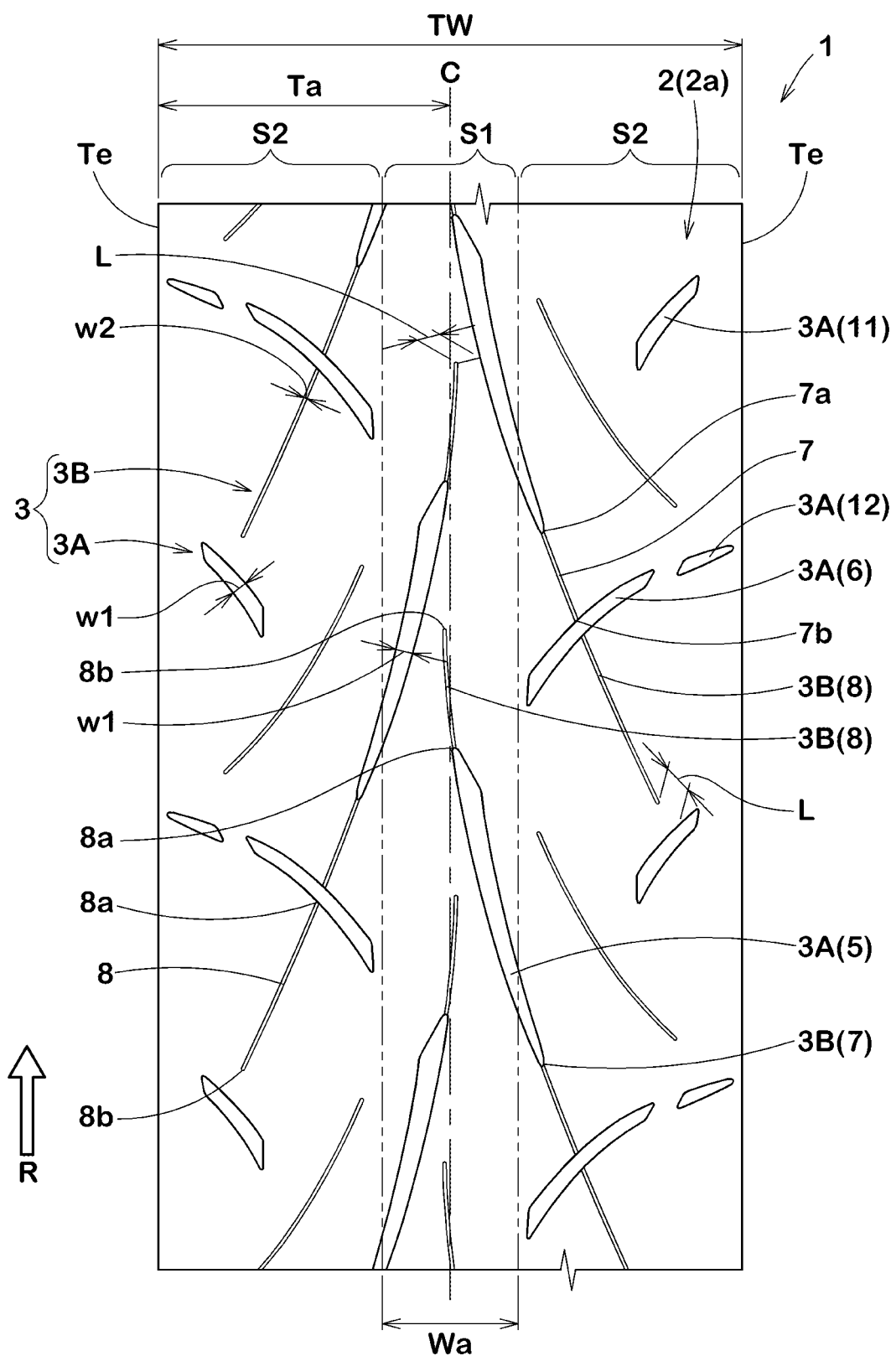
FIG. 1 is a development view of a tread portion of a tire for a motorcycle as an embodiment of the present invention.

FIG. 1 is a development view of a tread portion 2 of a tire 1 for a motorcycle in this embodiment (hereinafter, may be simply referred to as "tire 1"). The tire 1 in this embodiment has the tread portion 2 bound with an intended tire rotational direction (R). The tire rotational direction (R) is indicated by letters or marks on a sidewall portion (not shown). The internal structure of the tire 1 in this embodiment is the same as that of a conventional tire, therefore, explanation thereof is omitted.

The tread portion 2 is formed such that a ground contacting surface (2a) between tread edges (Te) of the tread portion 2 is curved in an arc shape (not shown) convex toward an outer side in a tire radial direction so that a sufficient ground contacting area can be obtained even during cornering with the large camber angle. A development length of the ground contacting surface (2a) between the tread edges (Te) is defined as a tread development width (Tw). Further, the development length of the ground contacting surface (2a) between one of the tread edges (Te) and a tire equator (C) is defined as a tread development half width (Ta).

In this specification, unless otherwise noted, the dimensions and the like of the tire 1 are those specified in a standard state. The standard state is a state in which the tire 1 is mounted on a standard rim (not shown), inflated to a standard inner pressure, and loaded with no tire load.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The ground contacting surface (2a) of the tread portion 2 includes a straight-running ground contacting region S1 including the tire equator (C) and a cornering ground contacting regions S2 located on both sides thereof in a tire axial direction. The straight-running ground contacting region S1 is a portion to be in contact with a flat surface when the tire 1 in the standard state is in contact with the flat surface with zero camber angles by being loaded with a standard tire load. Although not particularly limited, a width (wa) in the tire axial of the straight-running ground contacting region S1 is in the range of from 18% to 30% of the tread development width (TW).

The "standard load" is a tire load specified for the concerned tire by a standard included in a standardization system on which the tire 1 is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with grooves 3. The grooves 3 in this embodiment include main grooves 3A each having a groove width (w1) larger than 2 mm and narrow grooves 3B each having a groove width (w2) not more than 2 mm.

The main grooves 3A in this embodiment include first main grooves 5 and second main grooves 6 arranged on an outer side in the tire axial direction of the first main groove 5. In this specification, "arranged on the outer side in the tire axial direction" means that an inner end in the tire axial direction of one of the grooves 3 is arranged on the outer side in the tire axial direction of a center position of a length in the tire axial direction of another one of the grooves 3.

The narrow grooves 3B in this embodiment include open narrow grooves 7 and semi-open narrow grooves 8.

Each of the open narrow grooves 7 in this embodiment is arranged such that one end (7a) thereof is substantially connected with one of the first main grooves 5 and the other end (7b) thereof is substantially connected with one of the second main grooves 6. A first end (8a) of each of the semi-open narrow grooves 8 in this embodiment is substantially connected with one of the first main grooves 5 or one of the second main grooves 6. Further, a second end (8b) of each of the semi-open narrow grooves 8 terminates in the ground contacting surface (2a) of the tread portion 2 substantially without being connected with any one of the main grooves 3A. Each of the narrow grooves 7 and 8 configured as such decreases variations in pattern rigidity of the tread portion 2 across the inner side and the outer side in the tire axial direction, therefore, high transient characteristics are exerted. Furthermore, the main grooves 5 and 6 and the narrow grooves 7 and 8 cooperate to maintain the pattern rigidity of the tread portion 2 at a moderate level, therefore, preferred responsiveness of the vehicle body is obtained, thereby, the alacrity is improved. Therefore, the tire 1 in this embodiment has excellent cornering performance. The expression "substantially connected" means that the end in a longitudinal direction of one of the narrow grooves 3B is connected with its adjacent one of the main grooves 3A, or a shortest distance (L) between the end in the longitudinal direction and its adjacent one of the main grooves 3A is less than 5% of the tread development half width (Ta).

The main grooves 3A in this embodiment further include third main grooves 11 arranged on the outer side in the tire axial direction of the second main grooves 6 and fourth main grooves 12 arranged on the outer side in the tire axial direction of the third main grooves 11.

The main grooves 3A in this embodiment extend obliquely with respect to a tire circumferential direction. Further, each of the main grooves 3A in this embodiment is formed in a circular arc shape. The main grooves 3A configured as such have edge components in many directions, therefore, the cornering performance is improved.

The first main groove 5 in this embodiment is inclined continuously to one side with respect to the tire circumferential direction. The first main grooves 5 in this embodiment extend axially outwardly from the side of the tire equator (C) and obliquely toward the toe-side in the tire rotational direction (R). The first main grooves 5 configured as such decrease a change in the pattern rigidity of the tread portion 2, therefore, preferred transient characteristics are generated.

The first main grooves 5 are provided on each of one side (right side in the figure) and the other side (left side in the figure) of the tire equator (C) without crossing the tire equator (C). The first main grooves 5 configured as such maintain high pattern rigidity on the tire equator (C) to which large ground contact pressure is applied, therefore, stability during straight running and eventually the responsiveness of the vehicle body are improved.

Figure 2:
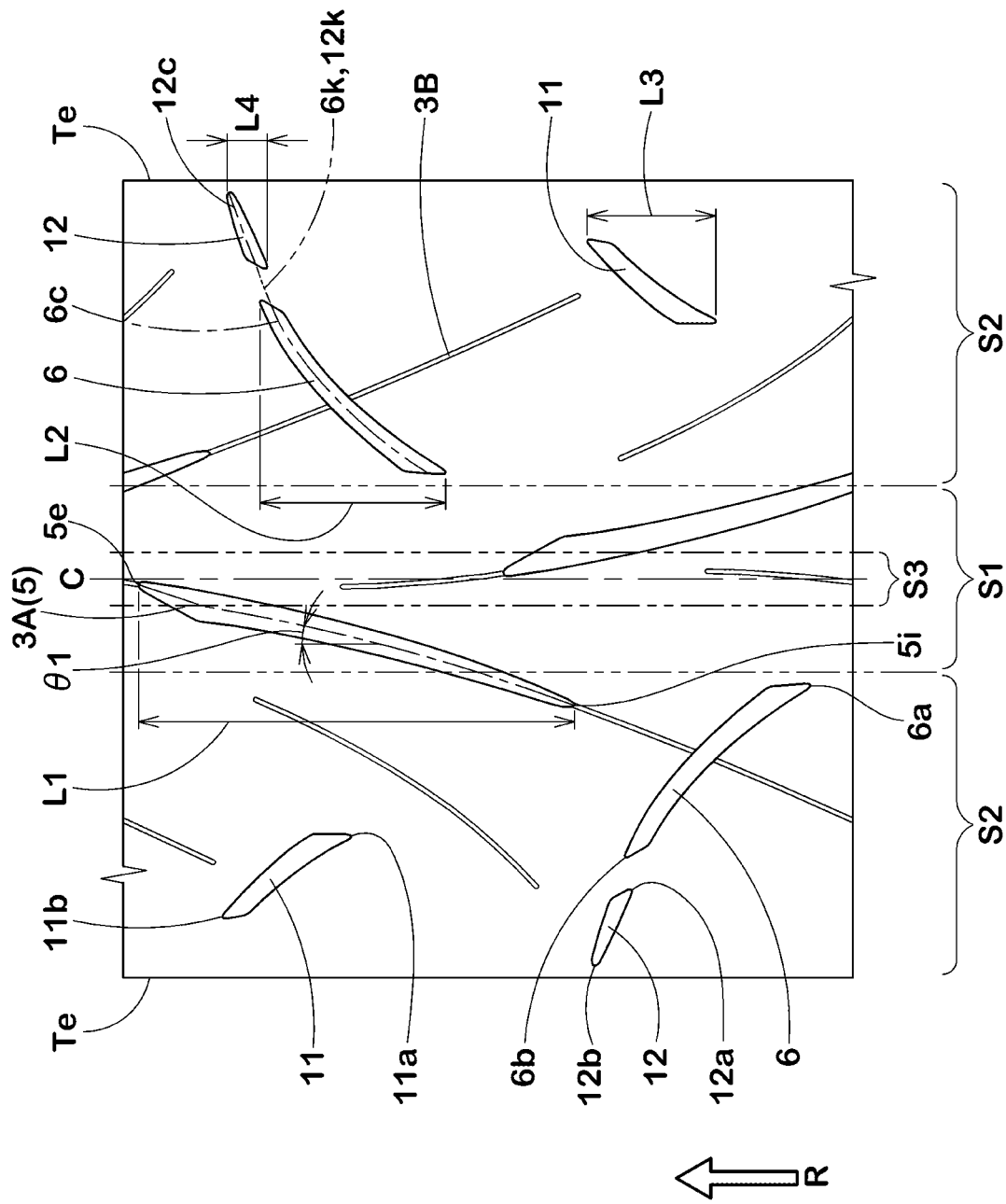
FIG. 2 is an enlarged view of FIG. 1.

FIG. 2 is an enlarged view of FIG. 1. As shown in FIG. 2, each of the first main grooves 5 has a heel-side end (Se) on the heel side in the tire rotational direction (R) and a toe-side end (5i) on the toe side in the tire rotational direction (R). The heel-side ends (5e) of the first main grooves 5 in this embodiment are arranged in the straight-running ground contacting region S1. The toe-side ends (5i) of the first main grooves 5 in this embodiment are arranged in the cornering ground contacting regions S2. The first main grooves 5 configured as such decrease a change in the pattern rigidity of the tread portion 2 which is to be in contact with the ground from the straight running state to the cornering state, therefore, the transient characteristic is improved.

The heel-side ends (5e) of the first main grooves 5 in this embodiment are arranged in a region S3 within 5% of the tread development half width (Ta) from the tire equator (C) to the outside in the tire axial direction. Thereby, it is possible that variation in the pattern rigidity is made small in a wide range of the straight-running ground contacting region S1.

Each of the first main grooves 5 in this embodiment is inclined at a small angle θ1 with respect to the tire circumferential direction. The first main grooves 5 are inclined at the smallest angle 81 among the main grooves 3A with respect to the tire circumferential direction, for example. The first main grooves 5 configured as such maintain a small change in the tire axial direction of the pattern rigidity in a region which is to be in contact with the ground from the straight running state to the early stage of cornering, therefore, excellent transient characteristic is exerted. Note that when the angle θ1 of each of the first main grooves 5 is excessively small, the pattern rigidity in the tire circumferential direction of the straight-running ground contacting region S1 may be excessively small, therefore, it is possible that the responsiveness of the vehicle body is deteriorated. Thereby, it is preferred that the angle θ1 of each of the first main grooves 5 is in the range of from 5 to 25 degrees. In this specification, the angle of each of the grooves 3 is the angle at the center position in the longitudinal direction of a groove center line thereof.

The second main grooves 6 in this embodiment extend axially outwardly and obliquely toward the heel side in the tire rotational direction (R). As described above, the second main grooves 6 in this embodiment are inclined in directions opposite to the first main grooves 5 with respect to the tire circumferential direction. Thereby, the edge components in the tire axial direction generated oppositely in the first main grooves 5 and the second main grooves 6 during running are canceled out, therefore, the transient characteristic is improved, thereby, the cornering performance is improved.

The second main grooves 6 in this embodiment are arranged in the cornering ground contacting regions S2 and not arranged in the straight-running ground contacting region S1.

Inner ends (6a) in the tire axial direction of the second main grooves 6 are located on a side of the tire equator (c) of the toe-side ends (5i) of the first main grooves 5. Thereby, in a pair of one of the first main grooves 5 and one of the second main grooves 6 adjacent to each other in the tire circumferential direction, the main grooves 3A are continuously formed in a region in the tire axial direction of the tread portion 2 which is provided with the first main groove 5 and the second main groove 6 (that is, a portion is formed in which the first main groove 5 and the second main groove 6 overlap in the tire circumferential direction). Therefore, in the tire 1 in this embodiment, the change in the pattern rigidity is maintained small.

Inner ends (11a) in the tire axial direction of the third main grooves 11 are located on the side of the tire equator (c) of outer ends (6b) in the tire axial direction of the second main grooves 6. Thereby, the main grooves 3A are continuously formed in a region in the tire axial direction region of the tread portion 2 which is provided with the second main grooves 6 and the third main grooves 11, therefore, the change in the pattern rigidity is further maintained small.

Each of the fourth main grooves 12 is provided at a position continuous with a virtual line (6k) obtained by smoothly and axially outwardly extending a groove center line (6c) of one of the second main grooves 6 adjacent thereto. Further, a virtual line (12k) obtained by smoothly and axially inwardly extending a groove center line (12c) of one of the fourth main grooves 12 is continuous with one of the second main grooves 6 adjacent thereto. The fourth main grooves 12 configured as such improve the responsiveness of the vehicle body. In this specification, the term "smoothly" means that the virtual line is formed as a straight line passing through three points consisting of both ends of the groove center line and a center point in the longitudinal direction thereof or an arc having the same curvature as an arc passing through the three points.

Inner ends (12a) in the tire axial direction of the fourth main grooves 12 are located on the side of the tire equator (C) of outer ends (11b) in the tire axial direction of the third main grooves 11. Thereby, the main grooves 3A are continuously formed in a region in the tire axial direction of the tread portion 2 which is provided with the third main grooves 11 and the fourth main grooves 12. That is, in this embodiment, in a region in the tire axial direction of the tread portion 2 between the heel-side end (5e) of the first main grooves 5 and outer ends (12b) of the fourth main grooves 12, there are portions in which a pair of the main grooves 3A adjacent to each other in the tire circumferential direction overlap each other and portions in which only one of the main grooves 3A is provided, when viewed in the tire circumferential direction. Further, the tread portion 2 in this embodiment does not have a portion in which three or more of the main grooves 3A overlap in the tire circumferential direction. Thereby, the change in the pattern rigidity is maintained small over a wide range of the tread portion 2 in the tire axial direction, therefore, the tire 1 in this embodiment has high transient characteristic.

A length L1 in the tire circumferential direction of each of the first main grooves 5, a length L2 in the tire circumferential direction of each of the second main grooves 6, a length L3 in the tire circumferential direction of each of the third main grooves 11, and a length L4 in the tire circumferential direction of each of the fourth main grooves 12 in this embodiment are defined by the following expression (1).

$$L1>L2>L3>L4 \quad (1)$$

In other words, the main grooves 3A arranged on the outer side in the tire axial direction are configured to have smaller lengths than those of the main grooves 3A arranged on the inner side in the tire axial direction. Thereby, a decrease in the pattern rigidity of the tread portion 2 on the axially outer side, to which large lateral force is applied during cornering, is suppressed, therefore, the cornering performance is maintained high.

Figure 3:
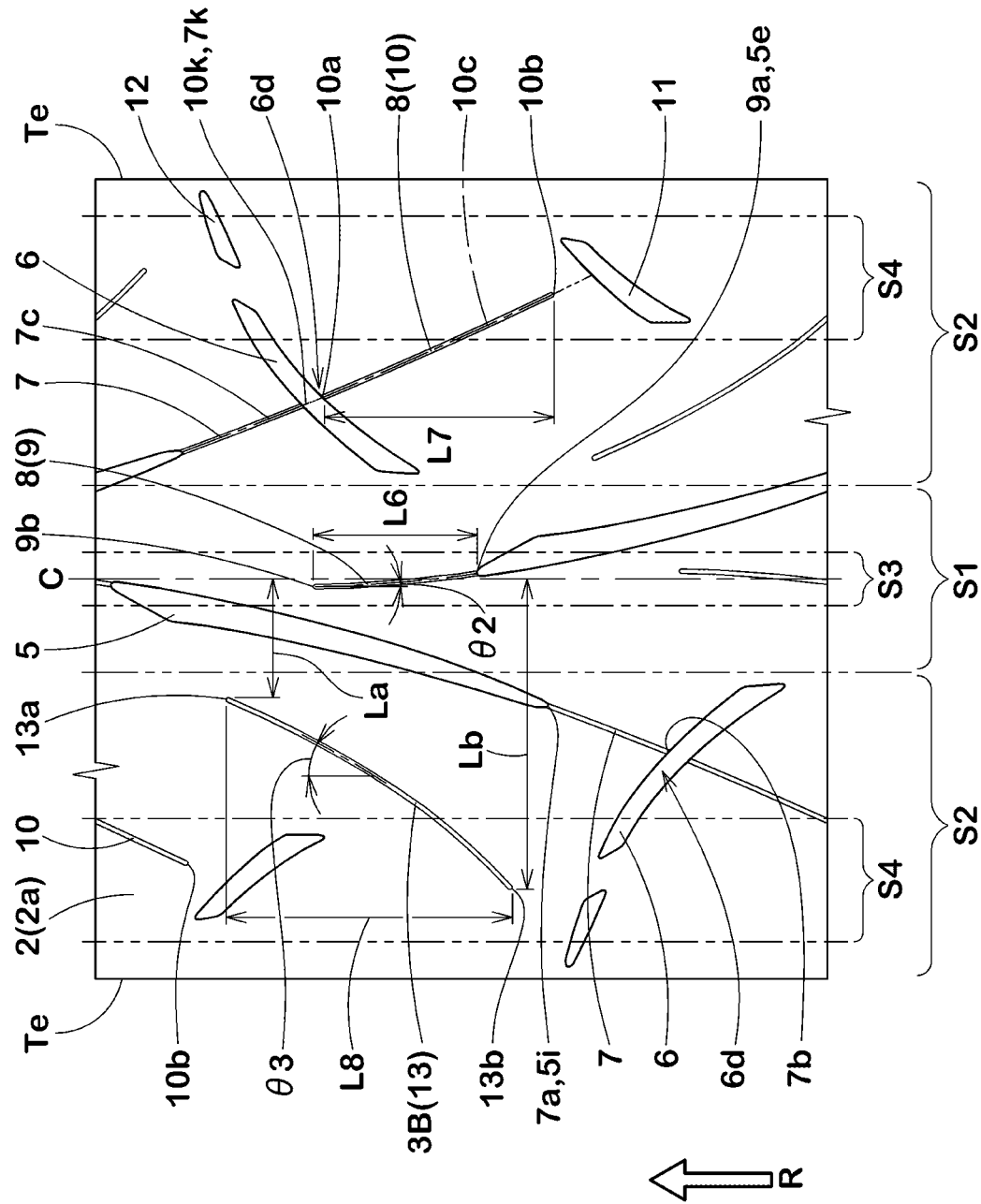
FIG. 3 is an enlarged view of FIG. 1.
Figure 4:
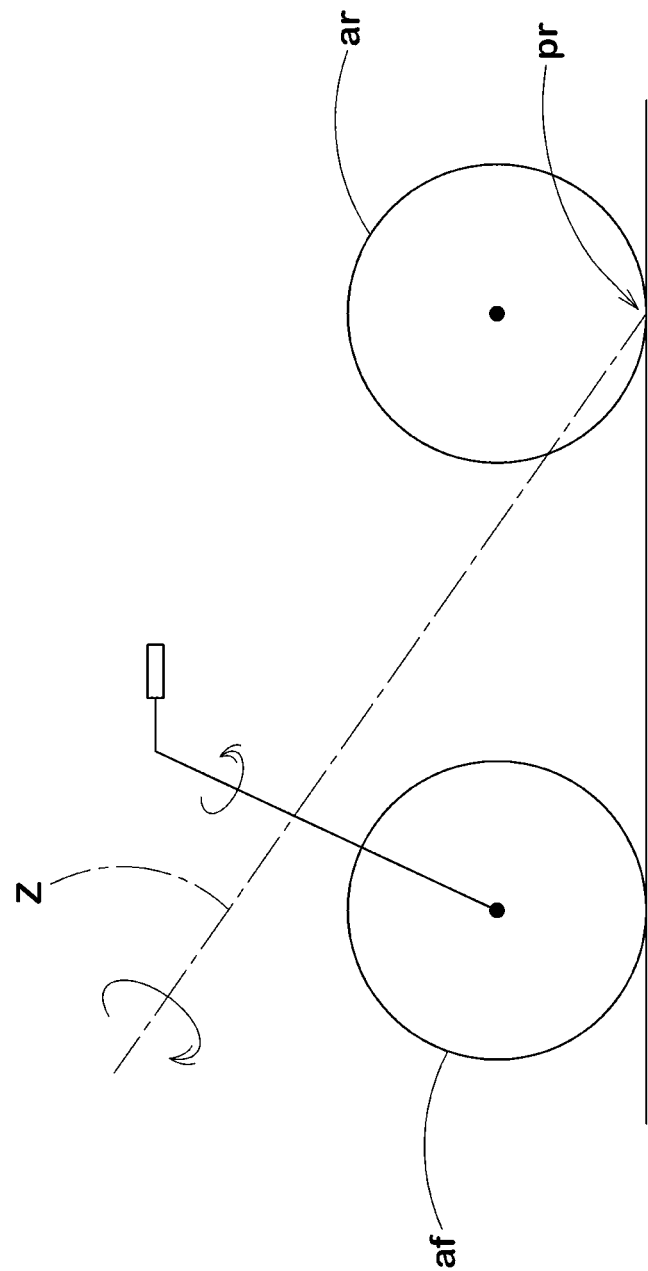
FIG. 4 is a schematic diagram showing a mechanism of cornering of a motorcycle.

FIG. 3 is an enlarged view of FIG. 1. As shown in FIG. 3, the one end (7a) of each of the open narrow grooves 7 in this embodiment is connected with toe-side end (5i) of one of the first main grooves 5 adjacent thereto. Further, the other end (7b) of each of the open narrow grooves 7 in this embodiment is connected with a center portion (6d) of one of the second main grooves 6 adjacent thereto. Each of the open narrow grooves 7 configured as such suppresses excessive decrease in the pattern rigidity while decreasing the change in the pattern rigidity between one of the first main groove 5 and its adjacent one of the second main grooves 6, therefore, it is possible that the transient characteristic and the alacrity are improved. In this specification, the "center portion (6d)" is a central portion when each of the second main grooves 6 is divided into three equal parts in the tire axial direction.

The open narrow grooves 7 in this embodiment are provided in the cornering ground contacting regions S2. Thereby, the cornering performance after the early stage of cornering is improved.

The semi-open narrow grooves 8 in this embodiment include first semi-open narrow grooves 9 each having a first end (9a) substantially connected with one of the first main grooves 5 and second semi-open narrow grooves 10 each having a first end (10a) substantially connected with one of the second main grooves 6. As described above, the semi-open narrow grooves 8 are substantially connected with the first main grooves 5 and the second main grooves 6 arranged separately in the tire axial direction, therefore, the change in the pattern rigidity of the tread portion 2 is further decreased, thereby, the transient characteristic is improved. The first end (9a) of each of the first semi-open narrow grooves 9 in this embodiment is connected with respective one of the first main grooves 5. The first end (10a) of each of the second semi-open narrow grooves 10 in this embodiment is connected with respective one of the second main grooves 6.

Each of the first semi-open narrow grooves 9 in this embodiment is formed so as to cross the tire equator (C). The first semi-open narrow grooves 9 configured as such decrease the change in the pattern rigidity of the straight-running ground contacting region S1 caused by provision of the first main grooves 5 without greatly decreasing the pattern rigidity of the tire equator (c) to which large ground contacting pressure is applied. Thereby, the transient characteristic and the alacrity are improved.

The first end (9a) of each of the first semi-open narrow grooves 9 in this embodiment is connected with the heel-side end (5e) of adjacent one of the first main grooves 5. Second ends (9b) of the first semi-open narrow grooves 9 are arranged in the straight-running ground contacting region S1. That is, the first semi-open narrow grooves 9 are arranged in the straight-running ground contacting region S1.

In order to improve the transient characteristic and the alacrity, it is preferred that the second ends (9b) of the first semi-open narrow grooves 9 are arranged in the region S3 within 5% of the tread development half width (Ta) from the tire equator (C) to the outer side in the tire axial direction.

Although not particularly limited, an angle θ2 of each of the first semi-open narrow grooves 9 with respect to the tire circumferential direction is preferably not more than 15 degrees, and more preferably not more than 10 degrees.

The first end (10a) of each of the second semi-open narrow grooves 10 in this embodiment is connected with the center portion (6d) in the longitudinal direction of adjacent one of the second main grooves 6. Second ends (10b) of the second semi-open narrow grooves 10 in this embodiment are arranged in a region 54 in the range of from 60% to 90% of the tread development half width (Ta) from the tire equator (c) to the outer side in the tire axial direction. That is, the second semi-open narrow grooves 10 are arranged in the cornering ground contacting regions S2. The second semi-open narrow grooves 10 configured as such improve the transient characteristic and the alacrity during and after the middle stage of cornering. It is more preferred that the second ends (10b) of the second semi-open narrow grooves 10 are arranged in the region in the range of from 65% to 80% of the tread development half width (Ta) from the tire equator (C) to the outer side in the tire axial direction.

Each of the second semi-open narrow grooves 10 in this embodiment is configured such that a virtual line (10k) obtained by smoothly extending a groove centerline (10c) thereof toward the side of the tire equator (c) is connected with adjacent one of the open narrow grooves 7. In this embodiment, a virtual line (7k) obtained by smoothly extending a groove center line (7c) of each of the open narrow grooves 7 toward the outer side in the tire axial direction is connected with adjacent one of the second semi-open narrow grooves 10. As described above, in this embodiment, one virtual narrow groove is formed by one of the second semi-open narrow grooves 10 and one of the open narrow grooves 7.

Each of the second semi-open narrow grooves 10 in this embodiment is configured to have a larger length in the tire circumferential direction than that of each of the first semi-open narrow grooves 9. That is, a length L6 in the tire circumferential direction of each of the first semi-open narrow grooves 9 is smaller than a length L7 in the tire circumferential direction of each of the second semi-open narrow grooves 10. Thereby, a large decrease in the rigidity of the straight-running ground contacting region S1 to which a large ground contacting pressure is applied is suppressed, therefore, it is possible that preferred responsiveness of the vehicle body is generated.

The narrow grooves 3B in this embodiment include closed narrow grooves 13 each having both ends (13a) and (13b) terminating on the ground contacting surface (2a) of the tread portion 2 substantially without being connected with any one of the main grooves 3A. The closed narrow grooves 13 configured as such suppress the decrease of the pattern rigidity of the tread portion 2 as compared with the semi-open narrow grooves 8, therefore, further, it is possible that preferred responsiveness of the vehicle body is generated.

The inner ends (13a) in the tire axial direction of the closed narrow grooves 13 in this embodiment are arranged on the outer side in the tire axial direction of the straight-running ground contacting region S1. That is, the closed narrow grooves 13 are arranged in the cornering ground contacting regions S2, therefore, the alacrity is improved during cornering after the early stage of cornering. It is preferred that a distance (La) in the tire axial direction between the inner end 13a of each of the closed narrow grooves 13 and the tire equator (c) is in the range of from 20% to 35% of the tread development half width (Ta).

The outer ends (13b) in the tire axial direction of the closed narrow grooves 13 in this embodiment are arranged on the outer side in the tire axial direction of the second ends (10b) of the second semi-open narrow grooves 10. Thereby, the above-described effects are effectively exerted. It is preferred that a distance (Lb) in the tire axial direction between the outer end (13b) of each of the closed narrow grooves 13 and the tire equator (C) is in the range of from 70% to 85% of the tread development half width (Ta).

Although it is not particularly limited, the inner ends (13a) in the tire axial direction of the closed narrow grooves 13 are arranged on the inner side in the tire axial direction of the first ends (10a) of the second semi-open narrow grooves 10.

Each of the closed narrow groove 13 in this embodiment is formed at an angle θ3 largest in each of the narrow grooves 3B with respect to the tire circumferential direction. Thereby, the closed narrow grooves 13 are arranged in a wide range in the tire axial direction, therefore, the cornering performance is improved in a wide range of the camber angle. It is preferred that the angle θ3 of each of the closed narrow grooves 13 is in the range of from 21 to 34 degrees.

In order to effectively exert the above effects, each of the closed narrow grooves 13 in this embodiment has a length L8 in the tire circumferential direction which is the largest among those of the narrow grooves 3B.

It is preferred that each of the narrow grooves 3B has a groove depth increasing from the outer side in the tire axial direction toward the side of the tire equator (c). Thereby, the decrease in the rigidity of the outer portions in the tire axial direction of the narrow grooves 3B to which large lateral force is applied during cornering is greatly suppressed, therefore, the alacrity is maintained. The groove depth of each of the narrow grooves 3B in this embodiment gradually increases from the outer side in the tire axial direction toward the side of the tire equator (C). Each of the first semi-open narrow grooves 9 in this embodiment has the largest groove depth on the tire equator (C).

Each of the narrow grooves 3B in this embodiment extends obliquely with respect to the tire circumferential direction. Each of the narrow grooves 3B in this embodiment is inclined continuously to one side with respect to the tire circumferential direction. Further, each of the narrow grooves 3B in this embodiment is formed in a circular arc shape. The narrow grooves 3B configured as such have the edge components in many directions.

Each of the narrow grooves 3B in this embodiment is inclined in the same direction with respect to the tire circumferential direction. The narrow grooves 3B configured as such suppress decrease in the pattern rigidity of the tread portion 2 between the narrow grooves 3B. Each of the narrow grooves 3B in this embodiment is inclined in the same direction as the first main grooves 5 with respect to the tire circumferential direction.

Each of the narrow grooves 3B in this embodiment is inclined in the direction opposite to the second main grooves 6 with respect to the tire circumferential direction. That is, each of the narrow grooves 3B is inclined in the opposite direction to the second main grooves 6, the third main grooves 11, and the fourth main grooves 12. Thereby, during cornering, the edge components in the tire axial direction generated in the main grooves 6, 11, and 12, and the narrow grooves 7, 9, and 10 are canceled out, therefore, the transient characteristic is improved, thereby, the cornering performance is improved.

Although it is not particularly limited, it is preferred that the groove width (w2) of each of the narrow grooves 3B is in the range of from 0.5 to 2.0 mm. It is preferred that the groove width (average in the longitudinal direction) of each of the narrow grooves 3B his in the range of from 0.3 to 1.3 mm.

The tread portion 2 in this embodiment has a pattern that is line symmetric with the tire equator (c) by having the tread portion 2 on one side in the tire axial direction of the tire equator (c) shifted in the tire circumferential direction. Note that the tread portion 2 is not limited to such an embodiment.

While detailed description has been made of the tire as an embodiment of the present invention, the present invention can be embodied in various forms without being limited to the illustrated embodiment.

WORKING EXAMPLES (EXAMPLES)

Tires for a motorcycle having the basic pattern shown in FIG. 1 were made by way of test according to the specifications listed in Table 1, and each of the test tires was tested for the cornering performance. Note that the common specifications are as follows.

Tire Size:
Front wheel: 120/70ZR17
Rear wheel: 180/55ZR17
Rim Size:
Front wheel: MT3.50×17
Rear wheel: MT5.50×17
Tire Inner Pressure:
Front wheel: 250 kPa
Rear wheel: 290 kPa
Groove widths of Main grooves: 5.0 mm
Groove depths of Main grooves: 4.5 mm
"Distance of second end of second semi-open narrow groove from Tire equator", "Distance of second end of First semi-open narrow groove from Tire equator", and "Distance of Inner end of closed narrow groove from Tire equator" in the Table 1 is the ratio (%) between each of the distances and the tread development half width (Ta).

The first and the second semi-open narrow grooves of Reference 1, Reference 2, and Example 2 in the Table 1 are configured such that the first and the second semi-open narrow grooves of FIG. 1 are smoothly extended.

The closed narrow grooves of the Table 1 are configured such that the closed narrow grooves of FIG. 1 are smoothly extended or shortened.

The angle of each of the second semi-open narrow grooves of Example 7 in the Table 1 with respect to the tire circumferential direction: 35 degrees The angle of each of the second semi-open narrow grooves except for those of the Example 7 in the Table 1 with respect to the tire circumferential direction: 23 degrees The angle of each of the open sipes with respect to the tire circumferential direction: 24 degrees The test methods were as follows.

<Alacrity and Transient Characteristic>

Each of the test tires was mounted on the rear wheel of a motorcycle with a displacement of 600 cc and then the test run was carried out on a dry asphalt road surface of a test course of 3700 m per lap and the "alacrity" and "transient characteristic" was evaluated by the test rider's feeling. The test results are indicated by an index based on the Reference 1 being 100, wherein a larger numerical value is better.

The test results are shown in the Table 1.

TABLE 1

| | | Ref. 1 | Ref. 2 | Ex. 1 | Ex. 2 | Ex. 3 | Ex. 4 | Ex. 5 | Ex. 6 |
|---|---|---|---|---|---|---|---|---|---|
| Shortest distance (L) of Second end of First semi-open narrow groove/Tread development half width (Ta) | [%] | 0 | 0 | 8 | 8 | 8 | 8 | 8 | 8 |
| Shortest distance (L) of Second end of Second semi-open narrow groove/Tread development half width (Ta) | [%] | 0 | 4 | 9 | 1 | 9 | 9 | 9 | 9 |
| Distance of Second end of Second semi-open narrow groove from Tire equator | [%] | 76 | 74 | 79 | 75 | 79 | 72 | 72 | 72 |
| Arrangement of First semi-open narrow grooves: crossing Tire equator or not | | crossing | crossing | crossing | crossing | not | crossing | crossing | crossing |
| Distance of Second end of First semi-open narrow groove from Tire equator | | 2 | 2 | 2 | 2 | 2 | 2 | 2 | 2 |
| Presence or Absence of Closed narrow groove | | Presence | Presence | Presence | Presence | Presence | Absence | Presence | Presence |
| Length of Closed narrow groove: largest among narrow grooves or not | | largest | largest | largest | largest | largest | — | smallest | largest |
| Angle of Closed narrow groove: largest among narrow grooves or not | | largest | largest | largest | largest | largest | — | largest | not largest |
| Angle θ3 of Closed narrow groove | [degree] | 27 | 27 | 27 | 27 | 27 | — | 27 | 27 |
| Distance (La) of Inner end of Closed narrow groove from Tire equator | [%] | 30 | 30 | 30 | 30 | 30 | — | 30 | 30 |
| Distance (Lb) of Outer end of Closed narrow groove from Tire equator | [%] | 77 | 77 | 77 | 77 | 77 | — | 77 | 77 |
| Inclination direction of Narrow grooves with respect to Tire circumferential direction: same or different | | same | same | same | same | same | — | same | same |
| Groove width (w2) of Narrow groove | [mm] | 1.0 | 1.0 | 1.0 | 1.0 | 1.0 | 1.0 | 1.0 | 1.0 |
| Groove depth of Narrow groove | [mm] | 0.7 | 0.7 | 0.7 | 0.7 | 0.7 | 0.7 | 0.7 | 0.7 |
| Alacrity | [evaluation point: larger is better] | 100 | 102 | 110 | 107 | 106 | 105 | 107 | 105 |
| Transient characteristic | [evaluation point: larger is better] | 100 | 102 | 105 | 102 | 102 | 102 | 103 | 104 |

| | | Ex. 7 | Ex. 8 | Ex. 9 | Ex. 10 | Ex. 11 | Ex. 12 | Ex. 13 | Ex. 14 |
|---|---|---|---|---|---|---|---|---|---|
| Shortest distance (L) of Second end of First semi-open narrow groove/Tread development half width (Ta) | [%] | 8 | 8 | 8 | 8 | 8 | 8 | 8 | 8 |
| Shortest distance (L) of Second end of Second semi-open narrow groove/Tread development half width (Ta) | [%] | 9 | 9 | 9 | 9 | 9 | 9 | 9 | 9 |
| Distance of Second end of Second semi-open narrow groove from Tire equator | [%] | 72 | 72 | 72 | 72 | 72 | 72 | 72 | 72 |
| Arrangement of First semi-open narrow grooves: crossing Tire equator or not | | crossing | crossing | crossing | crossing | crossing | crossing | crossing | crossing |
| Distance of Second end of First semi-open narrow groove from Tire equator | | 2 | 2 | 2 | 2 | 2 | 2 | 2 | 2 |
| Presence or Absence of Closed narrow groove | | Presence | Presence | Presence | Presence | Presence | Presence | Presence | Presence |
| Length of Closed narrow groove: largest among narrow grooves or not | | largest | largest | largest | largest | largest | largest | largest | largest |
| Angle of Closed narrow groove: largest among narrow grooves or not | | largest | largest | largest | largest | largest | largest | largest | largest |
| Angle θ3 of Closed narrow groove | [degree] | 35 | 27 | 27 | 27 | 27 | 27 | 27 | 27 |
| Distance (La) of Inner end of Closed narrow groove from Tire equator | [%] | 30 | 40 | 30 | 30 | 30 | 30 | 30 | 30 |
| Distance (Lb) of Outer end of Closed narrow groove from Tire equator | [%] | 77 | 77 | 88 | 77 | 77 | 77 | 77 | 77 |
| Inclination direction of Narrow grooves with respect to Tire circumferential direction: same or different | | same | same | same | different | same | same | same | same |
| Groove width (w2) of Narrow groove | [mm] | 1.0 | 1.0 | 1.0 | 1.0 | 0.4 | 2.1 | 1.0 | 1.0 |
| Groove depth of Narrow groove | [mm] | 0.7 | 0.7 | 0.7 | 0.7 | 0.7 | 0.7 | 0.2 | 1.5 |
| Alacrity | [evaluation point: larger is better] | 105 | 106 | 106 | 107 | 107 | 105 | 106 | 106 |
| Transient characteristic | [evaluation point: larger is better] | 103 | 104 | 103 | 103 | 102 | 104 | 103 | 102 |

From the test results, it was confirmed that both the transient characteristic and the alacrity were improved and the cornering performance was improved for the tires as the Examples. Further, the same tests were also conducted on tires for a motorcycle in which the groove widths of the main grooves and the narrow grooves, the arrangement of the second ends, etc. were changed within the preferred range, but the similar results were obtained.

The invention claimed is:

1. A tire for a motorcycle comprising a tread portion, wherein
   the tread portion is provided with main grooves each having a groove width larger than 2 mm and narrow grooves each having a groove width not more than 2 mm,
   the main grooves include first main grooves and second main grooves arranged on an outer side in a tire axial direction of the first main grooves,
   the narrow grooves include open narrow grooves and semi-open narrow grooves,
   each of the open narrow grooves is arranged such that one end thereof is substantially connected with adjacent one of the first main grooves and the other end thereof is substantially connected with adjacent one of the second main grooves,
   each of the semi-open narrow grooves has a first end and a second end, and the first end is substantially connected with adjacent one of the first main grooves or the second main grooves and the second end terminates on a ground contacting surface of the tread portion without being substantially connected with any one of the main grooves,
   the semi-open narrow grooves include first semi-open narrow grooves whose first ends are substantially connected with the first main grooves and second semi-open narrow grooves whose first ends are substantially connected with the second main grooves, and
   a length in a tire circumferential direction of each of the first semi-open narrow grooves is smaller than a length in the tire circumferential direction of each of the second semi-open narrow grooves.

2. The tire for a motorcycle according to claim 1, wherein each of the narrow grooves extends obliquely with respect to the tire circumferential direction and has a groove depth increasing from an outer side in the tire axial direction toward a side of a tire equator.

3. The tire for a motorcycle according to claim 1, wherein the second ends of the second semi-open narrow grooves are arranged in a region in a range of from 60% to 90% of a tread development half width from the tire equator toward the outer side in the tire axial direction.

4. The tire for a motorcycle according to claim 1, wherein each of the first semi-open narrow grooves extends so as to cross the tire equator, and the second end of each of the first semi-open narrow grooves is not connected with any one of the narrow grooves.

5. The tire for a motorcycle according to claim 1, wherein the second ends of the first semi-open narrow grooves are arranged in a region within 5% of the tread development half width from the tire equator toward the outer side in the tire axial direction, and the second end of each of the first semi-open narrow grooves is not connected with any one of the narrow grooves.

6. The tire for a motorcycle according to claim 1, wherein the narrow grooves include closed narrow grooves each having both ends terminating on the ground contacting surface of the tread portion without being substantially connected with any one of the main grooves or the narrow grooves.

7. The tire for a motorcycle according to claim 6, wherein the groove lengths in the tire circumferential direction of the closed narrow grooves are the largest among those of the narrow grooves.

8. The tire for a motorcycle according to claim 6, wherein the tread portion includes a straight-running ground contacting region which is a portion thereof to be in contact with a flat surface when the tire is mounted on a standard rim, inflated to a standard inner pressure, and in contact with a flat surface with zero camber angles by being loaded with a standard tire load, and
   inner ends in the tire axial direction of the closed narrow grooves are arranged on the outer side in the tire axial direction of the straight-running ground contacting region.

9. The tire for a motorcycle according to claim 6, wherein the closed narrow grooves are arranged at angles largest among the narrow grooves with respect to the tire circumferential direction.

10. The tire for a motorcycle according to claim 6, wherein
    each of the narrow grooves is inclined in the same direction with respect to the tire circumferential direction.

11. The tire for a motorcycle according to claim 6, wherein
    each of the narrow grooves is inclined in a direction opposite to the second main grooves with respect to the tire circumferential direction.

12. The tire for a motorcycle according to claim 6, wherein
    the semi-open narrow grooves include first semi-open narrow grooves each having the first end substantially connected with one of the first main grooves and second semi-open narrow grooves each having the first end substantially connected with one of the second main grooves, and
    outer ends in the tire axial direction of the closed narrow grooves are arranged on the outer side in the tire axial direction of the second ends of the second semi-open narrow grooves.

13. The tire for a motorcycle according to claim 2, wherein
    the semi-open narrow grooves include first semi-open narrow grooves whose first ends are substantially connected with the first main grooves and second semi-open narrow grooves whose first ends are substantially connected with the second main grooves.

14. The tire for a motorcycle according to claim 3, wherein
    each of the first semi-open narrow grooves extends so as to cross the tire equator.

15. The tire for a motorcycle according to claim 1, wherein
    an inclination angle of the open narrow groove with respect to the tire circumferential direction is substantially the same as an inclination angle of the second semi-open narrow groove with respect to the tire circumferential direction.

16. The tire for a motorcycle according to claim 1, wherein
    the tread portion is provided with a set of grooves including the first semi-open narrow groove, the first main groove, the open narrow groove, the second main groove and the second semi-open narrow groove continuously arranged in this order in a tire rotational direction.

\* \* \* \* \*